(12) United States Patent
Lu et al.

(10) Patent No.: US 11,640,195 B2
(45) Date of Patent: May 2, 2023

(54) SERVICE-LEVEL FEEDBACK-DRIVEN POWER MANAGEMENT FRAMEWORK

(71) Applicant: Alibaba Group Holding Limited, Grand Cayman (KY)

(72) Inventors: Qingda Lu, Bellevue, WA (US); Jun Song, Tacoma, WA (US); Zhu Pang, Bellevue, WA (US); Jiesheng Wu, Redmond, WA (US); Zhixing Ren, Sammamish, WA (US)

(73) Assignee: Alibaba Group Holding Limited, George Town (KY)

( * ) Notice: Subject to any disclaimer, the term of this patent is extended or adjusted under 35 U.S.C. 154(b) by 249 days.

(21) Appl. No.: 17/068,651

(22) Filed: Oct. 12, 2020

(65) Prior Publication Data

US 2022/0113785 A1    Apr. 14, 2022

(51) Int. Cl.
*G06F 1/26* (2006.01)
*G06F 1/3228* (2019.01)
*G06F 9/54* (2006.01)
*G06F 17/18* (2006.01)
*G06N 20/00* (2019.01)
*G06F 1/3203* (2019.01)

(52) U.S. Cl.
CPC .......... *G06F 1/3228* (2013.01); *G06F 9/542* (2013.01); *G06F 9/546* (2013.01); *G06F 17/18* (2013.01); *G06N 20/00* (2019.01); *G06F 1/3203* (2013.01)

(58) Field of Classification Search
CPC ........ G06F 1/3228; G06F 9/542; G06F 9/546; G06F 17/18; G06F 1/324; G06F 1/3287; G06F 1/3206; G06N 20/00; Y02D 10/00

USPC .......................................................... 713/320
See application file for complete search history.

(56) References Cited

U.S. PATENT DOCUMENTS

| | | | |
|---|---|---|---|
| 7,093,147 B2 | 8/2006 | Farkas et al. | |
| 7,574,613 B2 | 8/2009 | Holle et al. | |
| 8,230,245 B2 | 7/2012 | Khatri et al. | |
| 8,301,742 B2 | 10/2012 | Hanson et al. | |
| 8,904,209 B2 * | 12/2014 | Davis | G06F 1/3206 713/340 |
| 8,904,213 B2 * | 12/2014 | Chan | G06F 1/3287 713/320 |
| 9,274,585 B2 | 3/2016 | Breternitz et al. | |
| 9,329,910 B2 * | 5/2016 | Bohn | G06F 1/3287 |
| 9,575,542 B2 | 2/2017 | Yoon et al. | |
| 9,590,879 B2 * | 3/2017 | Wray | G06F 11/3409 |
| 10,761,590 B1 * | 9/2020 | Dixon | G06F 3/0619 |

(Continued)

*Primary Examiner* — Volvick Derose
(74) *Attorney, Agent, or Firm* — Lee & Hayes, P.C.

(57) ABSTRACT

A power management system may provide power management recommendations to a computer system including a plurality of computing nodes (which may include processors, etc.), to cause the computing nodes to individually or collectively adjust power states or modes of respective processors to achieve power management of the computer system. The power management system may be provided with a power management framework that continuously utilizes direct and indirect service-level feedbacks to guide power management decisions. The power management system may employ a reinforcement learning algorithm to make power management decisions at a user level, and provide a fast decision overriding mechanism for platform events or service-requested performance boosts.

18 Claims, 5 Drawing Sheets

(56) References Cited

U.S. PATENT DOCUMENTS

| | | | | |
|---|---|---|---|---|
| 2004/0255171 | A1* | 12/2004 | Zimmer | G06F 1/3203 |
| | | | | 713/300 |
| 2007/0283016 | A1* | 12/2007 | Pendarakis | H04L 12/66 |
| | | | | 709/226 |
| 2009/0062970 | A1* | 3/2009 | Forbes, Jr. | G06Q 10/06 |
| | | | | 700/295 |
| 2009/0254660 | A1* | 10/2009 | Hanson | H04L 12/10 |
| | | | | 709/226 |
| 2011/0239010 | A1* | 9/2011 | Jain | G06F 1/3209 |
| | | | | 713/310 |
| 2011/0289330 | A1* | 11/2011 | Gao | G06F 1/3203 |
| | | | | 713/320 |
| 2012/0290144 | A1* | 11/2012 | Yuasa | H02J 3/14 |
| | | | | 700/295 |
| 2013/0339759 | A1* | 12/2013 | Doddavula | G06F 1/3206 |
| | | | | 713/300 |
| 2014/0215241 | A1* | 7/2014 | Yoon | G06F 1/3275 |
| | | | | 713/320 |
| 2015/0301914 | A1* | 10/2015 | Phuong | G06F 1/324 |
| | | | | 713/322 |
| 2016/0239074 | A1* | 8/2016 | Lee | G06F 1/324 |
| 2017/0245217 | A1* | 8/2017 | Kim | H04W 52/0264 |
| 2018/0267820 | A1* | 9/2018 | Jang | G06F 9/5027 |
| 2018/0314309 | A1* | 11/2018 | Lyu | G06F 1/266 |
| 2018/0348837 | A1* | 12/2018 | Nguyen | G06F 1/266 |
| 2022/0113785 | A1* | 4/2022 | Lu | G06N 20/00 |
| 2022/0114032 | A1* | 4/2022 | Guim Bernat | G06F 9/5027 |

\* cited by examiner

SERVICE-LEVEL FEEDBACK-DRIVEN POWER MANAGEMENT FRAMEWORK

BACKGROUND

Computer systems nowadays involve complex networks or configurations of computing resources (such as processors, for example) and supporting resources (e.g., memory resources, etc.) that are configured to handle a large number of tasks or requests concurrently. Examples of such computer systems include a cloud system which usually involves hundreds or thousands of computing resources and supporting resources for providing services and applications to a variety of incoming requests received from a large number of users or customers at the same time. Normally, a service provider of the cloud system may have a service-level agreement (SLA) that ensures a minimum level of services to be maintained, and guarantees certain levels of reliability, availability and responsiveness of services and resources to be provided to each user.

Since the number and types of requests received from different users may vary over time, operating the cloud system (i.e., the computing resources and supporting resources, for example) at either a maximum capacity or a minimum capacity at all times may not be desirable and practical as this may lead to idleness of resources due to a few number of incoming requests on the one hand, or delays in responding to incoming requests due to insufficient of active resources to handle the incoming requests on the other hand. Accordingly, the service provider usually adopts a predefined power management strategy that aims to adaptively manage and utilize the resources in the cloud system in an efficient manner, while being able to timely serve any incoming requests. A power management strategy may decide to change a working state of a processor from one state (e.g., a high-power mode or a performance state) to another state (e.g., a low-power mode or a power saving state) based on certain performance metrics.

However, existing power management strategies primarily rely on processor-level performance metrics for making management decisions. These processor-level performance metrics merely consider certain activities of processors, and do not necessarily reflect actual needs and types of incoming requests received from various users and requirements for corresponding services or applications that are demanded by the requests, thus failing to adaptively assign appropriate resources to the services to handle the requests.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
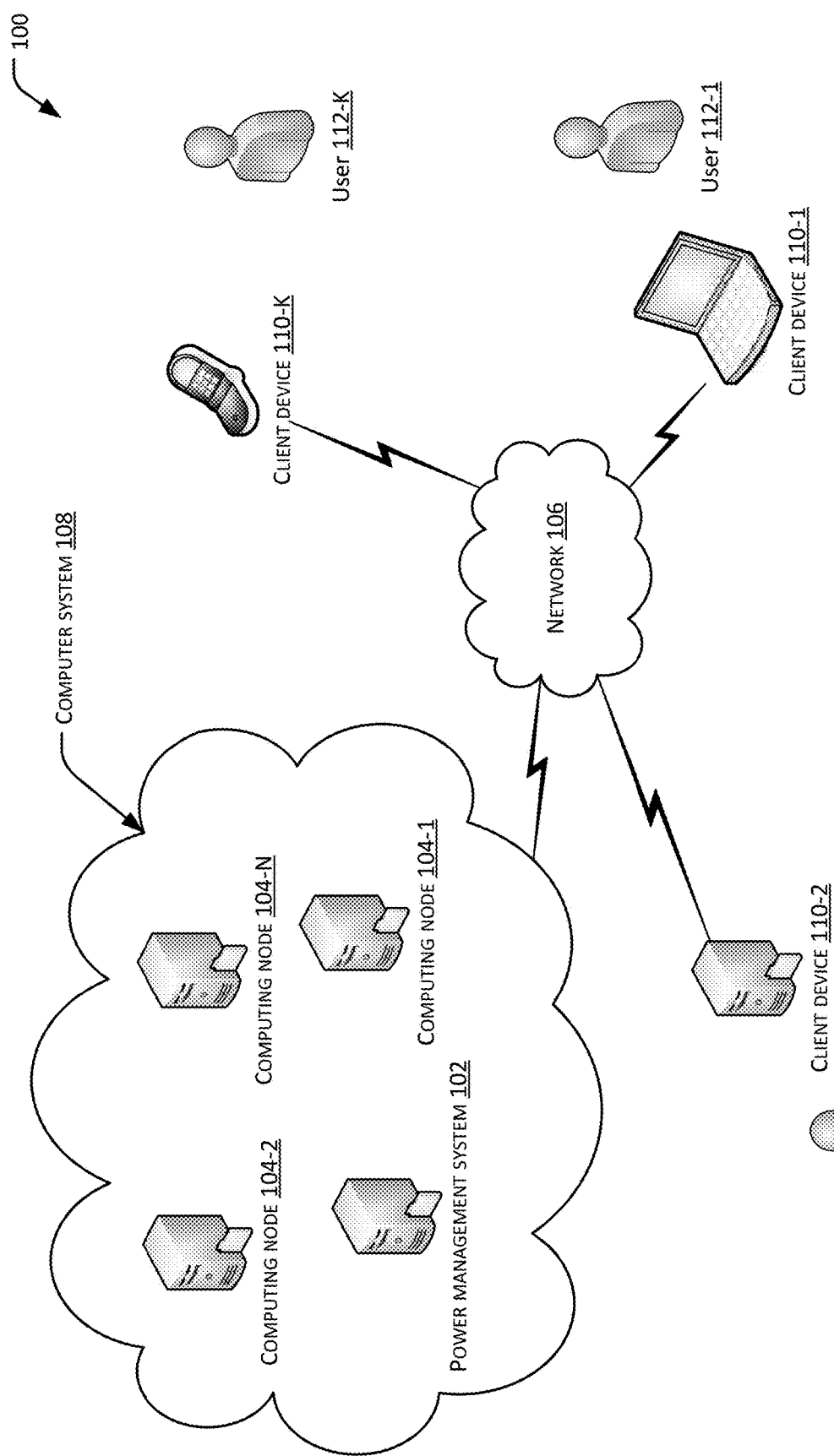
FIG. 1 illustrates an example environment in which a power management system may be used.

As noted above, conventional power management strategies primarily rely on performance metrics that do not necessarily reflect the actual needs and types of incoming requests received from various users and specific requirements for corresponding services or applications that are demanded by the requests. These existing power management strategies are particularly inadequate in cloud environments.

Requests for different services or applications provided by a cloud system with different SLAs may be handled by a same server or sometimes even a same processor. Processor-level feedbacks such as an interrupt rate and a residency history, etc., may not correlate to service-level performance metrics, and thus power management decisions made by a power management system for such cloud system may result in SLA violation or power over-provisioning. Furthermore, input/output (I/O) intensive services may have threads that are dedicated to I/O polling and thus may be busy or operate in maximum capacity most of the time. These I/O intensive services may drive underlying processors that support such services to maximum capacity (e.g., maximum clock frequency) if a conventional power management strategy is employed, leading to an increase in power consumed by the processors. However, such increase in power consumption may not necessarily lead to a performance gain due to workload characteristics or wasted polling cycles.

With an increase in deployments of services in cloud environments, power consumption of associated data centers have accounted for a large portion of total infrastructure cost. In order to save power and hence cost, a processor of a server in a cloud architecture or system may be instructed to enter into one of predefined low-power modes when being idle (which may collectively be called as a power saving state), or to lower a corresponding frequency or voltage dynamically to one of predefined high-power modes (or collectively referred to as performance states).

In implementations, a power management strategy may trade performance for power savings. For example, a deeper power-saving state may put a processor into a more energy-saving mode by turning off a power rail, flushing cache etc. at the cost of wakeup time (e.g. turning on the power rail) and post-wake performance (e.g. more cache misses). Similarly a deeper performance state may save dynamic power of a processor by running at a lower frequency at the cost of prolonged computing time, for example.

Prior to describing solutions for power management in computer systems, terminologies that may be used in this disclosure are briefly described herein. Specifically, a power cap may be referred to as a maximum amount of power that may be consumed by a computer system. A performance critical zone (PCZ) may be used to define a group of processors whose performance is critical to an overall performance of a server in a cloud architecture or system. During an execution of code, a computer system (or an operating system of the computer system) may optimize power consumption by allowing processors to be operated at different performance states. Depending on requirements and/or service demands, a processor may be operated at different frequencies, such as P0, P1, . . . , Pn, where P0 corresponds to the highest frequency (with the highest voltage), and n is a positive integer. In implementations, a processor may also enter into a low-power mode in order to save energy, and may have one or more low-power modes with one or more selected functions being reduced or turned off. The one or more low-power modes may collectively be called power-saving states, and may range from C1 to Cm states, where m is a positive integer. A performance counter may record hardware or software events which are used to indicate the performance of a system. A service workload may be defined as a sum of all requests made by different users or customer to a service component running on a single system, and a service may have multiple components to handle a user request. A service-level agreement SLA) is an agreement between a service provider of a cloud system and a customer that ensures a minimum level of service to be maintained, and guarantees levels of reliability, availability and responsiveness to systems and applications, while specifying which will govern when a service interruption exists.

This disclosure describes an example power management system. In implementations, the power management system is configured to provide power management recommendations to a computer system such as a cloud system including a plurality of computing nodes (which may include processors, etc.), to cause the computing nodes to individually or collectively adjust power states or modes of respective processors to achieve power management of the computer system. In implementations, the power management system may be provided with a power management framework that continuously utilizes direct and indirect service-level feedbacks to guide power management decisions. The power management system may employ a reinforcement learning algorithm to make power management decisions at a user level, and provide a fast decision overriding mechanism for platform events or service-requested performance boosts.

In implementations, the power management system may receive metric data, which may include, but is not limited to, operating system/hypervisor-level metrics, logical processor-level metrics, and service-level metrics from various sources (which may include, but not limited to, operating systems of the computing nodes, the processors of the computing nodes, services or applications running on the processors, etc.). In implementations, the power management system may conduct advisory decisions based at least in part on the metric data. Additionally, the power management system may further determine whether a message for increasing or boosting (or decreasing or canceling) performance is received from any service process running on any processor. Additionally, the power management system may further determine whether an emergent event or environmental change event is received (for example, whether a platform-level power management event, such as a thermal event or a power event, etc., occurs).

In implementations, the power management system may determine whether a state change or transition is to be applied for a processor (which may correspond to or be included in a computing node, for example) in the computer system based on at least one of the metric data, the message, and the platform-level power management event. The power management system may provide a power management recommendation or instruction to the computer system to cause the computer system to adjust corresponding processors of one or more computing nodes according to the power management recommendation or instruction. Alternatively, the power management system may directly provide power management recommendations to one or more computing nodes whose processor is recommended to undergo a state change or transition, so that the one or more computing nodes may perform a corresponding state change or transition to respective processors.

As described above, the power management system is able to consider additional information such as service-level metrics, message(s) from service process(es), and a platform-level power management event, etc., to determine whether a certain processor in a computer system needs to undergo a state transition, thereby making state transitions of processors to reflect and adapt to the needs of incoming requests and the actual processing environment of the computer system in real time.

In implementations, functions described herein to be performed by the power management system may be performed by multiple separate units or services. For example, a receiving service may receive metric data, a performance-related message (such as a performance boost message or a performance boost cancelation message) and/or a platform-level power management event from various sources, while a determination service may determine whether a state change or transition is to be applied for a processor in a computer system. Additionally, a recommendation service may provide a power management recommendation or instruction to the computer system or provide power management recommendations to one or more computing nodes whose processor is recommended to undergo a state change or transition.

Moreover, although in the examples described herein, the power management system may be implemented as a combination of software and hardware implemented and distributed in multiple devices, in other examples, the power management system may be implemented and distributed as services provided in one or more computing nodes over a network and/or in a cloud computing architecture.

The application describes multiple and varied embodiments and implementations. The following section describes an example framework that is suitable for practicing various implementations. Next, the application describes example systems, devices, and processes for implementing a power management system.

Example Environment

FIG. 1 illustrates an example environment 100 usable to implement a power management system. The environment 100 may include a power management system 102. In this example, the power management system 102 is described to exist as an individual entity or device. In some instances, some or all of the functions of the power management system 102 may be included in or provided by a plurality of computing nodes 104-1, 104-2, . . . , 104-N (which are collectively called as computing nodes 104), which are connected and communicated via a network 106, where N is a positive integer. In other instances, the power management system 102 may communicate data with the one or more computing nodes 104 via the network 106. In implementations, the plurality of computing nodes 104 may form a computer system 108 (such as a cloud computing architecture or system), or may form a part of the computer system 108. In implementations, the computer system 108 may provide a variety of services to a plurality of users or customers. In this example, the power management system 102 is described to be a part of the computer system 108. In other instances, the power management system 102 may be an individual entity that provides support (such as providing power management advices and monitoring performance of the computing nodes of the computer system 108) to the computer system 108.

In implementations, each of the computing nodes 104 may be implemented as any of a variety of devices having computing capabilities, and may include, but are not limited to, a processor (which may include a single-core processor or a multi-core processor), a desktop computer, a notebook or portable computer, a handheld device, a netbook, an Internet appliance, a tablet or slate computer, a mobile device (e.g., a mobile phone, a personal digital assistant, a smart phone, etc.), a server computer, etc., or a combination thereof.

The network 106 may be a wireless or a wired network, or a combination thereof. The network 106 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

In implementations, the power management system 102 may monitor performance of computing nodes 104 with respect to a number of requests sent by a plurality of client devices 110-1, 110-2, . . . , 110-M (which are collectively called as client devices 110) of different users or customers 112-1, 112-2, . . . , 112-K (which are collectively called as users 112), where M and K are positive integers. In implementations, the power management system 102 determine a power management strategy for each computing node 104 based on various types of information including at least feedbacks from services or applications provided in the computer system 108.

Example Power Management System

Figure 2:
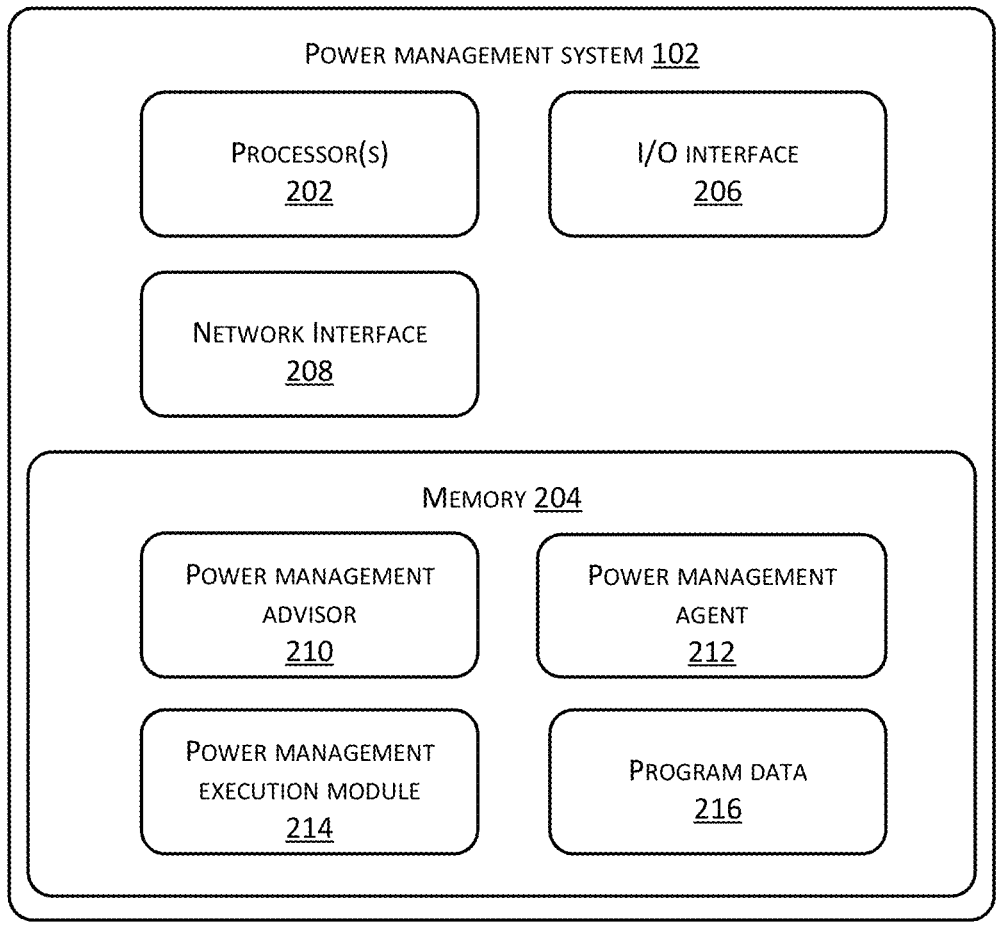
FIG. 2 illustrates an example power management system in more detail.

FIG. 2 illustrates the power management system 102 in more detail. In implementations, the power management system 102 may include, but is not limited to, one or more processors 202, memory 204, an input/output (I/O) interface 206, and/or a network interface 208. In implementations, some of the functions or components of the power management system 102 (for example, the one or more processors 202) may be implemented using hardware, for example, an ASIC (i.e., Application-Specific Integrated Circuit), a FPGA (i.e., Field-Programmable Gate Array), and/or other hardware. In this example, the power management system 102 may exist as a separate entity which may or may not be associated with a device such as the computing node 104. In some instances, some of the functions of the power management system 102 may be included in a device such as the computing node 104.

In implementations, the processors 202 may be configured to execute instructions that are stored in the memory 204, and/or received from the input/output interface 206, and/or the network interface 208. In implementations, the processors 202 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 204 may include computer readable media in a form of volatile memory, such as Random Access Memory (RAM) and/or non-volatile memory, such as read only memory (ROM) or flash RAM. The memory 204 is an example of computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include any transitory media, such as modulated data signals and carrier waves.

Although in this example, exemplary hardware components are described in the power management system 102, in other instances, the power management system 102 may further include other hardware components and/or other software components such as program units to execute instructions stored in the memory 204 for performing various operations. For example, the power management system 102 may further include a power management advisor 210, a power management agent 212, and a power management execution module 214. In implementations, the power management system 102 may further include program data 216 that stores data used for performing power management, such as performance metrics, model data, etc., which are described in further details hereinafter.

Figure 3:
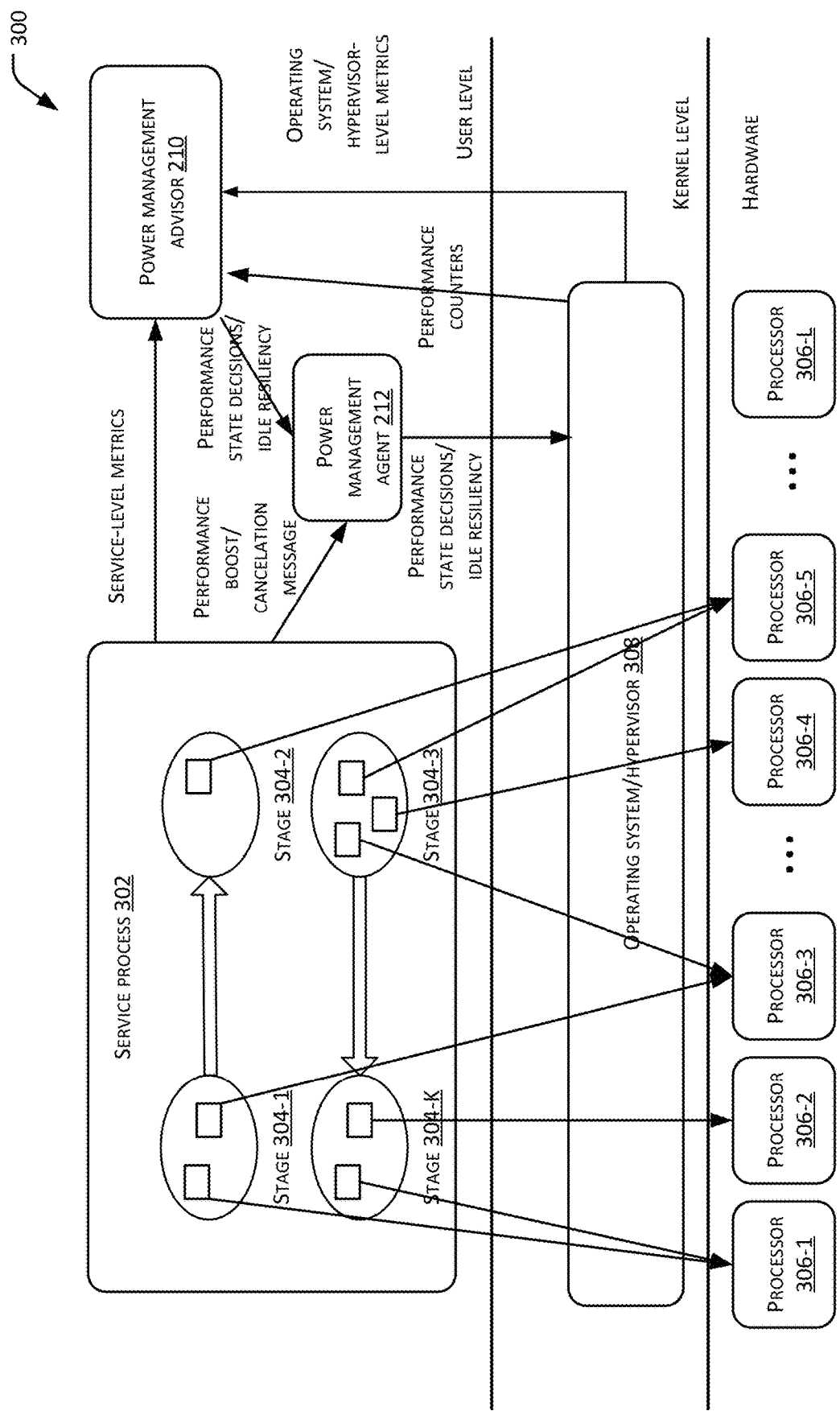
FIG. 3 illustrates an example framework of service-level feedback-driven power management.

FIG. 3 illustrates an example framework 300 of service-level feedback-driven power management. In implementations, each service process 302 provided by a computer system (e.g., a cloud system) may involve multiple processing stages 304-1, 304-2, 304-3, . . . , 304-K (which are collectively called as processing stages 304) to handle user requests. 4 processing stages are shown in this example for illustration, though any number of processing stages may be possible depending on a type of service. In implementations, each processing stage 304 may be associated with a dedicated thread pool that includes a plurality of worker threads. In implementations, each worker thread may be affinitized and/or run onto one of a plurality of processors 306-1, 306-2, 306-3, 306-4, 306-5, . . . , 306-L, (which are collectively called as processors 306, and may be logical or physical in nature). In implementations, each computing node 104 may include one or more processors 306. In implementations, upon receiving a request, the request may be assigned with a unique identifier (e.g., RID) based on request information such as a source IP (Internet Protocol) address, a user identifier, a device identifier of a client device from which the request is sent, etc. At each processing stage 304, a worker thread that is assigned to handle the request may be decided using a predefined assignment function, namely, Ti(RID), where i represents an $i^{th}$ processing stage. By way of example and not limitation, the assignment function Ti(RID) may be H(RID) mod Ni, where HO is a predefined hash function that uniformly distributes data, and Ni is the number of threads in a thread pool associated with the $i^{th}$ processing stage.

In implementations, the power management advisor 210 may be a background process, and may be configured to periodically make advisory power management decisions based on a plurality of inputs that are obtained or received from a computing node 104 within a predetermined time window or time interval. In implementations, the plurality of inputs may include, but are not limited to, operating system/hypervisor-level metrics, hardware metrics, and service-level metrics.

In implementations, the performance management advisor 210 may receive the operating system/hypervisor-level metrics from an operating system/hypervisor 308 of the computing node 104. In implementations, the operating system/hypervisor-level metrics may be associated with each processor 306 included in the computing node, and may include, for example, an utilization rate, an idle history, a timer interrupt history, and an interrupt rate, etc., of the processor within a predetermined time window or time interval.

In implementations, the performance management advisor 210 may receive the hardware metrics (e.g., logical processor-level metrics) of processors or processing units from performance counters of the processors 306 through the operating system/hypervisor 308 (e.g., through profiling interfaces of the operating system/hypervisor 308). In implementations, the hardware metrics may include, but are not limited to, cycles per instruction (CPI), cache misses per instruction (MPI), total memory reads and writes (memory bandwidth), total network reads and writes (network bandwidth), and total disk reads and writes (disk bandwidth), etc.

In implementations, the performance management advisor 210 may receive the service-level metrics from individual service processes (such as the service process 304 in this example). In implementations, the service-level metrics may include, but are not limited to, measured service-level performance metrics (for example, requests per second, an average latency, a latency at a predefined percentile such as 99th percentile, etc.), expected values of the service-level performance metrics (for example, requests per second, an average latency, a latency at a predefined percentile such as 99th percentile, etc.), implementation-specific metrics for each worker thread (e.g., an average depth of each individual waiting queue, an average wait time of requests, etc.).

In implementations, the power management advisor 210 may make advisory power management decisions based at least in part on at least some of the above inputs on a periodic basis (e.g., every 10 seconds, every 1 minutes, etc.) or on demand (e.g., in response to receiving a request from any one of the computing nodes 104, etc.). In implementations, the power management advisor 210 may compute idle resiliency of each processor for a next time step (e.g., next 1 millisecond, 1 second, etc.) to facilitate decision making for power-saving states. In implementations, the power management advisor 210 may send power management decisions to the power management agent 212.

In implementations, the power management agent 212 may exist or run continuously as a background process. The power management agent 212 may be configured to receive one or more inputs, and drive or prompt state transition of a processor in the computing node 104 via the power management execution module 214. By way of example and not limitation, the one or more inputs may include, but are not limited to, advisory power management decision(s) sent from the power management advisor 210, a performance boost message sent from the service process 304, platform-level power management event(s) sent from the operating system/hypervisor 308, etc.

In implementations, the power management agent 212 may adopt the power management decision(s) received from the power management advisor 210 if no performance boost message is received from any service process running on the computing node 104 and no platform-level power management event(s) is/are received. In implementations, a service process may determine that its performance metrics are too low for its SLA, and may directly send a message to boost up performance (or simply called as a performance boost message) to the power management agent 212 on behalf of worker threads thereof. In this case, the power management agent 212 may override current advisory decisions received from the power management advisor 210, and attempt to select a maximum possible performance state and a minimum possible idle resiliency for passing to the power management execution module 214. In implementations, the advisory decisions that are overridden may be in effect until the power management agent 212 receives a message to cancel the performance boost (or simply called as a performance boost cancelation message) from the service process. In implementations, the platform-level power management events may include, but are not limited to, thermal events (such as processor overheating, etc.), power events (e.g., platform power budget changes, etc.), for example. In implementations, in response to receiving platform-level power management event(s), the power management agent 212 may override advisory decisions received from the power management advisor 210 and any performance boost message (if any received from a service process) at such platform-level power management events.

In implementations, the power management execution module 214 may be configured to report supported P-state information (which may include, but is not limited to, a respective frequency of each discrete state, performance state domains such as core level or processor level, etc.) to the power management advisor 210 and the power management agent 212. In implementations, the power management execution module 214 may delegate most of performance state decision-making responsibilities to the power management advisor 210 and the power management agent 212, and may enforce performance state transitions by programming control registers in response to receiving performance state transition instructions from the power management agent 212. Additionally, the power management execution module 214 may retain power-saving state selection and enforcing logic, while using the programmed idle resiliency to cap the deepest possible power-saving state.

Example Methods

Figure 4:
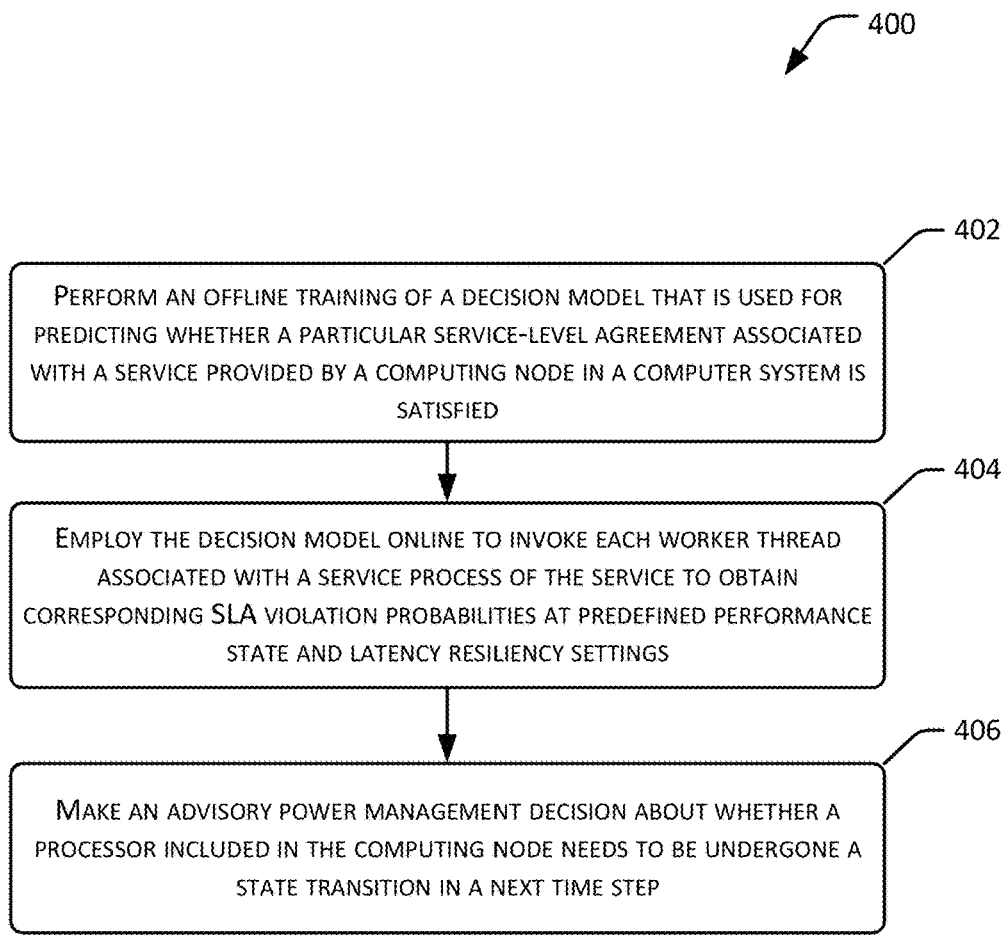
FIG. 4 illustrates an example method of service-level feedback-driven power management.
Figure 5:
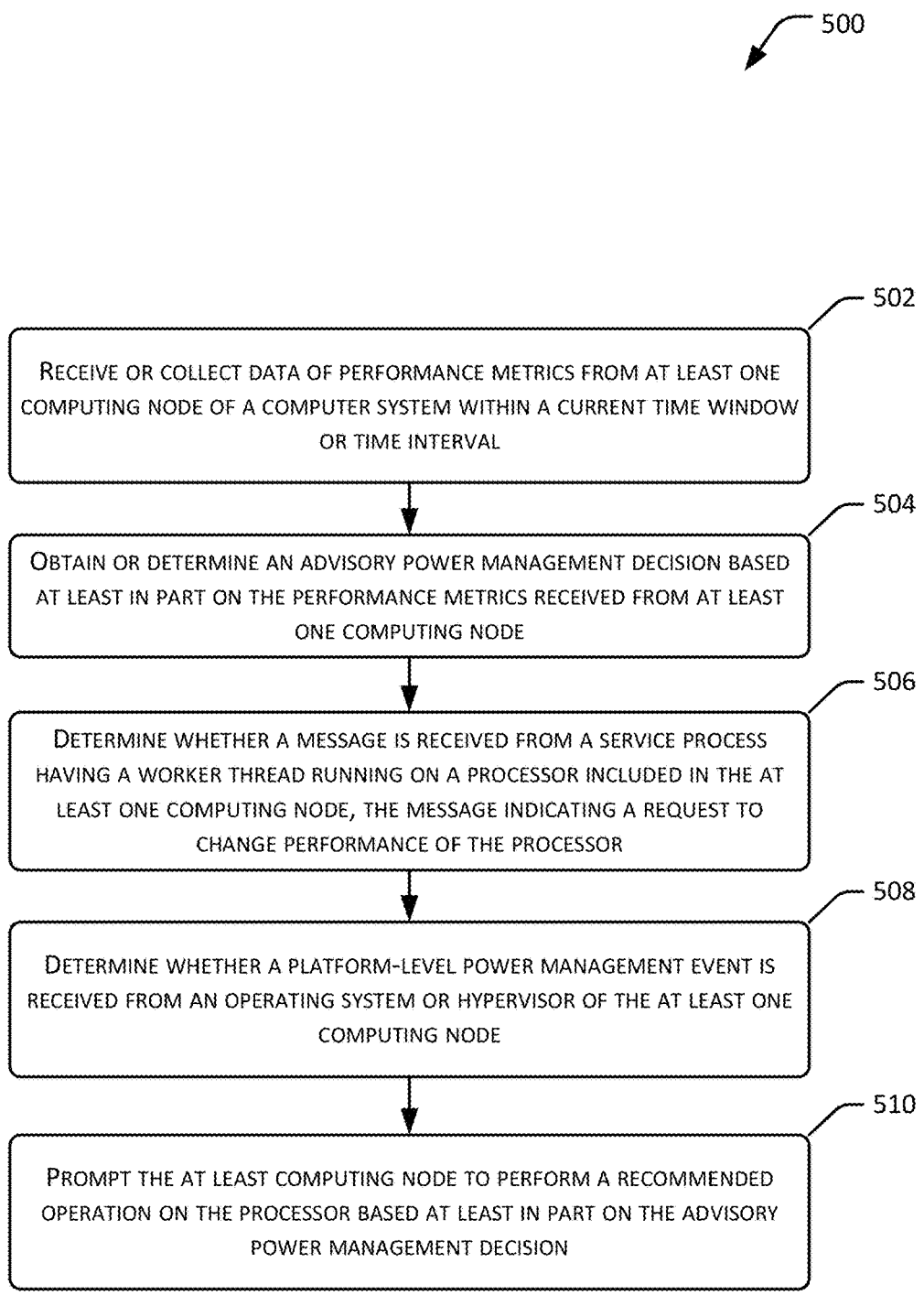
FIG. 5 illustrates another example method of service-level feedback-driven power management.

FIG. 4 shows a schematic diagram depicting an example method of service-level feedback-driven power management. FIG. 5 shows a schematic diagram depicting another example method of service-level feedback-driven power management. The methods of FIGS. 4 and 5 may, but need not, be implemented in the environment of FIG. 1, and using the system of FIG. 2 and the framework of FIG. 3. For ease of explanation, methods 400 and 500 are described with reference to FIGS. 1-3. However, the methods 400 and 500 may alternatively be implemented in other environments and/or using other systems.

The methods 400 and 500 are described in the general context of computer-executable instructions. Generally, computer-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 4, at block 402, the power management system 102 may perform an offline training of a decision model that is used for predicting whether a particular service-level agreement associated with a service provided by a computing node in a computer system is satisfied.

In implementations, prior to a deployment of a specific service in the computer system (e.g., deploying the service in a certain computing node of the computer system), the power management system 102 may perform offline model training. In implementations, the power management system 102 may train a decision model that is used for predicting whether a service-level agreement (SLA) between a service provider of the computer system and a user or customer is likely to be maintained or violated in a next time step. In implementations, the decision model may include a machine learning model, such as a neural network model, a decision tree model, a Markov process, etc., which is able to learn implicit rules and/or patterns associated with power management of the computer system or a computing node in the computer system under supervised learning. In implementations, the decision model which may be trained using a conventional reinforcement learning method and modeled as a model-free Markov decision process is used as the decision model as an example.

Regardless of which type of machine learning model is used for the decision model, in implementations, during training (e.g., under an offline training or operating environment), various micro benchmarks (which are computational intensive, memory intensive, and/or I/O intensive, for example) may run in parallel with the service to emulate real-world resource influences and pressures from other co-deployed services. In implementations, the power management system 102 may train the decision model using historical data of aforementioned performance metrics, which may include, for example, operating system/hypervisor-level metrics, hardware metrics, and service-level metrics as described in the foregoing description. In implementations, the power management system 102 may employ the decision model to predict probabilities of the SLA being violated at predefined performance state and latency resiliency settings in a next time step.

At block 404, the power management system 102 may employ the decision model online to invoke each worker thread associated with a service process of the service to obtain corresponding SLA violation probabilities at predefined performance state and latency resiliency settings.

In implementations, during runtime, the power management system 102 may perform a runtime decision making. In implementation, the power management system 102 may implement a conventional model-free reinforcement learning method, and employ the decision model that is trained offline at block 402 online to invoke each worker thread associated with a service process of the service to obtain corresponding SLA violation probabilities at predefined performance state and latency resiliency settings. In implementations, the power management system 102 may receive data of performance metrics such as operating system/hypervisor-level metrics, hardware metrics, and service-level metrics within a predefined time window or time interval, and use these performance metrics as inputs to the trained decision model to obtain corresponding model scores (i.e., SLA violation probabilities at predefined performance state and latency resiliency settings).

In implementations, based on the corresponding model scores, the power management system 102 may calculate a reward for each worker thread and combine (e.g., sum up) respective rewards of the worker threads together using a formula such as $R=\Sigma_{i=0}^{N}f(p_i)$. In this example formula, $p_i$ represents a probability that an thread may violate the SLA in a next time step. $f(\ )$ is a function to compute a reward for the thread to maintain certain power states in the next time step, and is zero when the SLA is maintained and not violated. In implementations, $f(\ )$ may be a negative superlinear function that penalizes heavily on a higher probability of violating the SLA. R is a sum of rewards for all worker threads running in a certain processor.

At block 406, the power management system 102 may make an advisory power management decision about whether a processor included in the computing node needs to be undergone a state transition in a next time step.

In implementations, after calculating a sum of rewards for all worker threads running in a certain processor, the power management system 102 may determine whether the processor needs to be undergone based on a value of the sum of rewards. For example, if the value of the sum of rewards for all worker threads running in the processor is less than a predefined threshold (e.g., 0, −0.1, etc., which indicates an apparent probability or likelihood of having the SLA to be violated in a next time step if no change is made to the processor), the power management system 102 may make an advisory power management decision to recommend the computing node to increase the performance of the processor to a certain power mode. In implementation, increasing the performance of the processor may include, but is not limited to, changing a state of the processor from a power-saving state to a performance state, changing a mode of the processor from a lower power mode to a higher power mode, increasing a frequency of the processor, etc.

In implementations, multiple worker threads from different services (or different service processes) may be co-located on a same processor (which may be logical or physical in nature). In this case, the power management system 102 may make an advisory power management decision for the processor based on an aggregation of all threads of different services that are co-located in that processor. For example, the above operations may be performed for each service running on a same processor or a same computing node, and a corresponding decision model may be trained and obtained for each service. Following the same operations as described above, an advisory power management decision requesting the processor to be operated in a particular power mode may be obtained for each service. An advisory power management decision that requests the processor to be operated in the highest power mode among the advisory power management decisions of the different services may be selected as a final advisory power management decision to be made or recommended by the power management system 102.

Referring to FIG. 5, at block 502, the power management system 102 may receive or collect data of performance metrics from at least one computing node of a computer system within a current time window or time interval.

In implementations, the power management system 102 (or the power management advisor 210) may proactively or passively receive data of performance metrics from at least one computing node of a computer system in every predetermined time window or time interval. In implementations, the performance metrics may include, but are not limited to, one or more of operating system/hypervisor-level metrics, hardware metrics, and service-level metrics as described in the foregoing description. In implementations, the power management system 102 (or the power management advisor 210) may monitor a status of a service-level agreement between a service provider of the computer system and a user or customer continuously or periodically, to ensure that the service-level agreement is maintained. In implementations, the power management system 102 (or the power management advisor 210) may receive or collect data of performance metrics associated with a computing node that provides a service involved in the service-level agreement in every predetermined time window or time interval (e.g., 1 second, 10 second, 1 minute, etc.).

At block 504, the power management system 102 may obtain or determine an advisory power management decision based at least in part on the performance metrics received from at least one computing node.

In implementations, after obtaining the performance metrics from the at least one computing node, the power management system 102 (or the power management advisor 210) may determine an advisory power management decision based at least in part on the performance metrics received from the at least one computing node. In implementations, the power management system 102 (or the power management advisor 210) may employ a decision model (such as the decision model as described in the foregoing description), and estimate or predict a likelihood of violating the service-level agreement if performance of one or more processors included in the at least one computing node is not increased.

By way of example and not limitation, the power management system 102 (or the power management advisor 210) may predict probabilities of violating the service-level agreement associated with the service provided by the at least one computing node under different power modes (such as different performance states, and different power-saving states, for example) of a processor in which at least one worker thread of the service involved in the service-level agreement is run using the decision model. In implementations, the power management system 102 (or the power management advisor 210) may use some or all of the received performance metrics as inputs to the decision model to obtain the probabilities of violating the service-level agreement associated with the service under different power modes of the processor. In implementations, the power management system 102 may also obtain a prediction score (such as a sum of rewards as described in the foregoing description and FIG. 4) that may reflect a likelihood of violating the service-level agreement if a current power mode of the processor is not changed to a higher power mode.

In implementations, upon obtaining the prediction score for the processor, the power management system 102 may determine whether the processor included in the at least computing node needs to undergo a state transition to avoid the service-level agreement from being violated. In implementations, the power management system 102 may determine that a current power mode of the processor needs to be changed to a higher power mode if the prediction score (such as a sum of rewards as described in the foregoing description and FIG. 4) is less than a predefined threshold. In implementations, the power management system 102 may select one of higher power modes that are available for the processor as an advisory power management decision.

In implementations, the power management system 102 may determine that the current power mode of the processor may be maintained or the processor may be changed to a lower power mode if the prediction score is greater than or equal to the predefined threshold. In this case, the power management system 102 may set that the current power mode or the lower power mode of the processor as an advisory power management decision. Alternatively, At block 506, the power management system 102 may determine whether a message is received from a service process having a worker thread running on a processor included in the at least one computing node, the message indicating a request to change performance of the processor.

In implementations, the service (or a service process instantiated for the service and having at least one worker thread running on a processor included in the at least one computing node) may be configured to actively send a message to the power management system 102 (or the power management agent 212 of the power management system 102) to request the processor to be operated in a certain power mode (e.g., a certain performance state, etc.). In implementations, the service (or the service process having at least one worker thread running on the processor) may directly send a message to request a performance boost or increase (or simply called a performance boost message) to the power management system 102 (or the power management agent 212).

By way of example and not limitation, the service process having at least one worker thread running on the processor may detect a waiting time for a worker thread running on the processor (i.e., a time duration for the worker thread to stay in a waiting queue waiting to be handled by the processor) may be higher than a predefined waiting time threshold. The service process may send a performance boost message to the power management system 102 (or the power management agent 212) to request an increase or boost in the performance of the processor. In implementations, the predefined waiting time threshold may be set as an average waiting time (or latency), a median waiting time, or a $p^{th}$ percentile waiting time in a previous time window or time interval, etc., where p is any integer between 1 and 99.

In implementations, in an event that the service has sent a performance boost message to the power management system 102 (or the power management agent 212), the service process may further need to send a performance cancelation message to cancel effects of the performance boost message on power management of the processor. In other words, the performance cancelation message informs the power management system 102 (or the power management agent 212) that the previous request made by the service process through the performance cancelation message is no longer effective and does not need to be considered when the power management system 102 (or the power management agent 212) decides whether to recommend the at least one computing device to perform a state transition for the processor.

In implementations, the power management system 102 (or the power management agent 212) may determine whether a message (e.g., a performance boost message or a performance cancelation message) is received from the service process in a current time step.

At block 508, the power management system 102 may determine whether a platform-level power management event is received from an operating system or hypervisor of the at least one computing node.

In implementations, the computer system or the at least one computing node may encounter a platform-level power management event, such as a thermal event (e.g., overheating, etc.), a power event (such as a power outage, a power budget change, etc.), an environmental change event, etc. In this case, the computer system or the at least one computing node may send a notification to the power management system 102 (or the power management agent 212), informing that the platform-level power management event occurs, and any advisory power management decision made by the power management system 102 may be ignored or overridden. Furthermore, after the platform-level power management event is resolved, the computer system or the at least one computing node may send another notification to the power management system 102 (or the power management agent 212), informing that the platform-level power management event has been resolved, and the power management system 102 may resume or continue operations such as making an advisory power management decision, checking whether a message (such as a performance boost message or a performance cancelation message, etc.) is received from any service process of the at least one computing node or other computing nodes, etc.

At block 510, the power management system 102 may prompt the at least computing node to perform a recommended operation on the processor based at least in part on the advisory power management decision.

In implementations, depending on whether a message (such as a performance boost message or a performance cancelation message) is received from the service or the service process having at least one worker thread running on the processor and whether a platform-level power management event is received from the at least one computing node (such as the operating system or hypervisor of the at least one computing node), the power management system 102 (or the power management agent 212) may or may not prompt the at least computing node to perform a recommended operation on the processor according to the advisory power management decision.

In implementations, the power management system 102 (or the power management agent 212) may adopt the advisory power management decision as a recommendation to prompt the at least computing node to perform a recommended operation on the processor if no message (such as a performance boost message) is received from any service process running on the computing node 104 and no platform-level power management event is received.

In implementations, as described above, the service process may determine that its performance metrics are too low for its SLA, and may directly send a message to boost up performance (i.e., a performance boost message) to the power management system 102 (or the power management agent 212) on behalf of a worker thread thereof. In this case, the power management system 102 (or the power management agent 212) may override e current advisory power management decision determined based on the decision model, and attempt to select a maximum possible performance state and a minimum possible idle resiliency as a recommendation to prompt the at least computing node to perform a recommended operation on the processor. In implementations, any new power management advisory decisions for the processor may continuously be ignored or overridden until the power management system 102 (or the power management agent 212) receives a message to cancel the performance boost (i.e., a performance boost cancelation message) from the service process.

Additionally, in implementations, in case if a notification indicating an occurrence of a platform-level power management event is received from the at least one computing node, the power management system 102 (or the power management agent 212) may override or ignore the advisory power management decision and any performance boost message (if any is received from the service process) due to the platform-level power management event. Since the notification indicating the occurrence of the platform-level power management event is received from the at least one computing node, the power management system 102 (or the power management agent 212) may or may not need to send a recommendation to the at least one computing node. In case if a recommendation is sent, the power management system 102 (or the power management agent 212) may send the recommendation as a formal acknowledgement indicating that the power management system 102 (or the power management agent 212) is aware of the platform-level power management event and requesting an update from the at least one computing node after the platform-level power management event is resolved.

In implementations, the power management system 102 (or the power management execution module 214) may further report supported performance state information (which may include, but is not limited to, a respective frequency of each discrete state, performance state domains such as core level or processor level, etc.) to other components of the power management system 102, i.e., the power management advisor 210 and the power management agent 212 for record.

In implementations, the power management system 102 may repeat the above operations (i.e., method blocks 502-510) for other services or applications provided by the computer system 108. Furthermore, since multiple worker threads from different services (or different service processes) may be co-located on a same processor (which may be logical or physical in nature), in implementations, the power management system 102 may make an advisory power management decision for the processor based on an aggregation of all threads of different services that are co-located in that processor. The above method blocks 502-510 may be performed for each service running on a same processor or a same computing node, and a corresponding decision model may be trained and obtained for each service. Following the same operations as described above, an advisory power management decision requesting the processor to be operated in a particular power mode may be obtained for each service. An advisory power management decision that requests the processor to be operated in the highest power mode among the advisory power management decisions of the different services may be selected as a final advisory power management decision to be made or recommended by the power management system 102.

Although the above method blocks are described to be executed in a particular order, in some implementations, some or all of the method blocks can be executed in other orders, or in parallel. Furthermore, in some implementations, some of all of the method blocks may be temporarily suspended, and may be resumed after a notification is received by the power management system 102. For example, the power management system 102 may determine whether a platform-level power management event is received from an operating system or hypervisor of the at least one computing node at block 508, prior to obtaining or determining an advisory power management decision at block 504 and determining whether a message is received from a service process having a worker thread running on a processor included in the at least one computing node at block 506. For another example, the power management system 102 may determine whether a message is received from a service process having a worker thread running on a processor included in at least one computing node at block 506, prior to obtaining or determining an advisory power management decision at block 504. In implementations, these method blocks may be performed in parallel.

CONCLUSION

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method implemented by one or more computing devices, the method comprising: obtaining an advisory power management decision based at least in part on service-level metrics that are received from a computing node; and prompting the computing node to perform a recommended operation on a processor that is included in the computing node based at least in part on the advisory power management decision.

Clause 2: The method of Clause 1, further comprising receiving hardware metrics and operating system/hypervisor-level metrics from the computing node, wherein obtaining the advisory power management decision is further based on the hardware metrics and operating system/hypervisor-level metrics.

Clause 3: The method of Clause 2, wherein the service-level metrics comprise one or more of requests per second, an average latency, and a latency at a predefined percentile for each processor in the computing node within a predefined time window, and one or more of an average depth of each individual waiting queue and an average wait time of requests that are associated with each worker thread running on each processor in the computing node within the predefined time window.

Clause 4: The method of Clause 2, wherein the hardware metrics comprise one or more of: cycles per instruction, cache misses per instruction, total memory reads and writes, total network reads and writes, and total disk reads and writes within a predefined time window.

Clause 5: The method of Clause 2, wherein the operating system/hypervisor-level metrics comprise one or more of: a utilization rate, an idle history, a timer interrupt history, and an interrupt rate associated with each processor in the computing node within a predefined time window.

Clause 6: The method of Clause 1, further comprising: receiving a message from a service process having a worker thread running on the processor included in the computing node, the message indicating a prompt to increase performance of the processor; and overriding the advisory power management decision, and sending a recommendation to the computing node to increase the performance of the processor according to the message.

Clause 7: The method of Clause 6, wherein increasing the performance of the processor comprises increasing a frequency of the processor, or changing the processor from a power-saving state to a performance state.

Clause 8: The method of Clause 1, further comprising: receiving a platform-level power management event from an operating system or hypervisor of the computing node; and overriding the advisory power management decision, and prompting the computing node to adjust performance of the processor according to the platform-level power management event.

Clause 9: The method of Clause 8, wherein the platform-level power management event comprises at least a thermal event, or a power budget change.

Clause 10: The method of Clause 1, wherein obtaining the advisory power management decision comprises: predicting probabilities of violating a service-level agreement associated with a service provided by the computing node under different states of the processor included in the computing node through a decision model that uses at least the service-level metrics as inputs, the service having at least one worker thread running on the processor; and selecting at least one state of the processor that does not violate the service-level agreement as the advisory power management decision.

Clause 11: The method of Clause 10, further comprising obtaining the decision model by training the decision model using a reinforcement learning method.

Clause 12: One or more computer readable media storing executable instructions that, when executed by one or more processors, cause the one or more processors to perform acts comprising: obtaining an advisory power management decision based at least in part on service-level metrics that are received from a computing node; and prompting the computing node to perform a recommended operation on a processor that is included in the computing node based at least in part on the advisory power management decision.

Clause 13: The one or more computer readable media of Clause 12, the acts further comprising receiving hardware metrics and operating system/hypervisor-level metrics from the computing node, wherein obtaining the advisory power management decision is further based on the hardware metrics and operating system/hypervisor-level metrics.

Clause 14: The one or more computer readable media of Clause 13, wherein: the service-level metrics comprise one or more of requests per second, an average latency, and a latency at a predefined percentile for each processor in the computing node within a predefined time window, and one or more of an average depth of each individual waiting queue and an average wait time of requests that are associated with each worker thread running on each processor in the computing node within the predefined time window; the hardware metrics comprise one or more of: cycles per instruction, cache misses per instruction, total memory reads and writes, total network reads and writes, and total disk reads and writes within a predefined time window; and the operating system/hypervisor-level metrics comprise one or more of: a utilization rate, an idle history, a timer interrupt history, and an interrupt rate associated with each processor in the computing node within a predefined time window.

Clause 15: The one or more computer readable media of Clause 12, the acts further comprising: receiving a message from a service process having a worker thread running on the processor included in the computing node, the message indicating a prompt to increase performance of the processor; and overriding the advisory power management decision, and sending a recommendation to the computing node to increase the performance of the processor according to the message.

Clause 16: The one or more computer readable media of Clause 12, the acts further comprising: receiving a platform-level power management event from an operating system or hypervisor of the computing node; and overriding the advisory power management decision, and prompting the computing node to adjust performance of the processor according to the platform-level power management event.

Clause 17: The one or more computer readable media of Clause 12, wherein obtaining the advisory power management decision comprises: predicting probabilities of violating a service-level agreement associated with a service provided by the computing node under different states of the processor included in the computing node through a decision model that uses at least the service-level metrics as inputs, the service having at least one worker thread running on the processor; and selecting at least one state of the processor that does not violate the service-level agreement as the advisory power management decision.

Clause 18: A system comprising: one or more processors; and memory storing executable instructions that, when executed by the one or more processors, cause the one or more processors to perform acts comprising: receiving service-level metrics, hardware metrics, and operating system/hypervisor-level metrics from a computing node; obtaining an advisory power management decision based at least in part on the service-level metrics, the hardware metrics, and the operating system/hypervisor-level metrics; and prompting the computing node to perform a recommended operation on a processor that is included in the computing node based at least in part on the advisory power management decision.

Clause 19: The system of Clause 18, the acts further comprising: receiving a message from a service process having a worker thread running on the processor included in the computing node, the message indicating a prompt to increase performance of the processor; and overriding the advisory power management decision, and sending a recommendation to the computing node to increase the performance of the processor according to the message.

Clause 20: The system of Clause 18, wherein obtaining the advisory power management decision comprises: predicting probabilities of violating a service-level agreement associated with a service provided by the computing node under different states of the processor included in the computing node through a decision model that uses the service-level metrics, the hardware metrics, and the operating system/hypervisor-level metrics as inputs, the service having at least one worker thread running on the processor; and selecting at least one state of the processor that does not violate the service-level agreement as the advisory power management decision.

What is claimed is:

1. A method implemented by one or more computing devices, the method comprising:
   obtaining an advisory power management decision based at least in part on service-level metrics that are received from a computing node, wherein obtaining the advisory power management decision comprises:
      predicting probabilities of violating a service-level agreement associated with a service provided by the computing node under different states of a processor included in the computing node through a decision model that uses at least the service-level metrics as inputs, the service having at least one worker thread running on the processor, and the decision model being obtained using a reinforcement learning method; and
   prompting the computing node to perform a recommended operation on a processor that is included in the computing node based at least in part on the advisory power management decision.

2. The method of claim 1, further comprising receiving hardware metrics and operating system/hypervisor-level metrics from the computing node, wherein obtaining the advisory power management decision is further based on the hardware metrics and operating system/hypervisor-level metrics.

3. The method of claim 2, wherein the service-level metrics comprise one or more of requests per second, an average latency, and a latency at a predefined percentile for each processor in the computing node within a predefined time window, and one or more of an average depth of each individual waiting queue and an average wait time of requests that are associated with each worker thread running on each processor in the computing node within the predefined time window.

4. The method of claim 2, wherein the hardware metrics comprise one or more of: cycles per instruction, cache misses per instruction, total memory reads and writes, total network reads and writes, and total disk reads and writes within a predefined time window.

5. The method of claim 2, wherein the operating system/hypervisor-level metrics comprise one or more of: a utilization rate, an idle history, a timer interrupt history, and an interrupt rate associated with each processor in the computing node within a predefined time window.

6. The method of claim 1, further comprising:
   receiving a message from a service process having a worker thread running on the processor included in the computing node, the message indicating a prompt to increase performance of the processor; and
   overriding the advisory power management decision, and sending a recommendation to the computing node to increase the performance of the processor according to the message.

7. The method of claim 6, wherein increasing the performance of the processor comprises increasing a frequency of the processor, or changing the processor from a power-saving state to a performance state.

8. The method of claim 1, further comprising:
   receiving a platform-level power management event from an operating system or hypervisor of the computing node; and overriding the advisory power management decision, and prompting the computing node to adjust performance of the processor according to the platform-level power management event.

9. The method of claim 8, wherein the platform-level power management event comprises at least a thermal event, or a power budget change.

10. The method of claim 1, wherein obtaining the advisory power management decision further comprises:
selecting at least one state of the processor that does not violate the service-level agreement as the advisory power management decision.

11. One or more non-transitory media storing executable instructions that, when executed by one or more processors, cause the one or more processors to perform acts comprising:
obtaining an advisory power management decision based at least in part on service-level metrics, hardware metrics and operating system/hypervisor-level metrics that are received from a computing node, wherein the service-level metrics comprise one or more of requests per second, an average latency, and a latency at a predefined percentile for each processor in the computing node within a predefined time window, and one or more of an average depth of each individual waiting queue and an average wait time of requests that are associated with each worker thread running on each processor in the computing node within the predefined time window; and
prompting the computing node to perform a recommended operation on a processor that is included in the computing node based at least in part on the advisory power management decision.

12. The one or more non-transitory media of claim 11, wherein:
the hardware metrics comprise one or more of: cycles per instruction, cache misses per instruction, total memory reads and writes, total network reads and writes, and total disk reads and writes within a predefined time window; and
the operating system/hypervisor-level metrics comprise one or more of: a utilization rate, an idle history, a timer interrupt history, and an interrupt rate associated with each processor in the computing node within a predefined time window.

13. The one or more non-transitory media of claim 11, the acts further comprising:
receiving a message from a service process having a worker thread running on the processor included in the computing node, the message indicating a prompt to increase performance of the processor; and
overriding the advisory power management decision, and sending a recommendation to the computing node to increase the performance of the processor according to the message.

14. The one or more non-transitory media of claim 11, the acts further comprising:
receiving a platform-level power management event from an operating system or hypervisor of the computing node; and
overriding the advisory power management decision, and prompting the computing node to adjust performance of the processor according to the platform-level power management event.

15. The one or more non-transitory media of claim 11, wherein obtaining the advisory power management decision comprises:
predicting probabilities of violating a service-level agreement associated with a service provided by the computing node under different states of the processor included in the computing node through a decision model that uses at least the service-level metrics as inputs, the service having at least one worker thread running on the processor; and
selecting at least one state of the processor that does not violate the service-level agreement as the advisory power management decision.

16. A system comprising:
one or more processors; and
memory storing executable instructions that, when executed by the one or more processors, cause the one or more processors to perform acts comprising:
receiving service-level metrics, hardware metrics, and operating system/hypervisor-level metrics from a computing node;
obtaining an advisory power management decision based at least in part on the service-level metrics, the hardware metrics, and the operating system/hypervisor-level metrics, wherein the service-level metrics comprise one or more of requests per second, an average latency, and a latency at a predefined percentile for each processor in the computing node within a predefined time window, and the operating system/hypervisor-level metrics comprise one or more of: a utilization rate, an idle history, a timer interrupt history, and an interrupt rate associated with each processor in the computing node within a predefined time window; and
prompting the computing node to perform a recommended operation on a processor that is included in the computing node based at least in part on the advisory power management decision.

17. The system of claim 16, the acts further comprising:
receiving a message from a service process having a worker thread running on the processor included in the computing node, the message indicating a prompt to increase performance of the processor; and
overriding the advisory power management decision, and sending a recommendation to the computing node to increase the performance of the processor according to the message.

18. The system of claim 16, wherein obtaining the advisory power management decision comprises:
predicting probabilities of violating a service-level agreement associated with a service provided by the computing node under different states of the processor included in the computing node through a decision model that uses the service-level metrics, the hardware metrics, and the operating system/hypervisor-level metrics as inputs, the service having at least one worker thread running on the processor; and
selecting at least one state of the processor that does not violate the service-level agreement as the advisory power management decision.

* * * * *